United States Patent
Feng et al.

(10) Patent No.: US 9,565,693 B2
(45) Date of Patent: Feb. 7, 2017

(54) COMMUNICATION METHOD, MULTIMODE TERMINAL, BASE STATION AND SYSTEM

(71) Applicant: Huawei Technologies Co., Ltd., Shenzhen (CN)

(72) Inventors: Shulan Feng, Beijing (CN); Jinnan Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 160 days.

(21) Appl. No.: 14/170,249

(22) Filed: Jan. 31, 2014

(65) Prior Publication Data

US 2014/0148191 A1 May 29, 2014

Related U.S. Application Data

(63) Continuation of application No. PCT/CN2012/078536, filed on Jul. 12, 2012.

(30) Foreign Application Priority Data

Aug. 2, 2011 (CN) .......................... 2011 1 0219913

(51) Int. Cl.
*H04W 72/00* (2009.01)
*H04W 72/12* (2009.01)
*H04W 88/06* (2009.01)

(52) U.S. Cl.
CPC ..... *H04W 72/1215* (2013.01); *H04W 72/1257* (2013.01); *H04W 88/06* (2013.01)

(58) Field of Classification Search
CPC ...... H04W 16/14; H04W 88/06; H04W 24/00; H04W 72/0453; H04W 24/02; H04W 16/10; H04W 28/10; H04W 28/24; H04W 76/02; H04W 76/025; H04W 80/00; H04W 88/02; H04W 72/0406; H04W 24/10; H04W 48/08; H04L 12/5692; H04L 27/0006; H04L 5/001; H04L 5/0033; H04L 63/20

(Continued)

(56) References Cited

U.S. PATENT DOCUMENTS

2002/0025781 A1* 2/2002 Saito ................. H04M 1/72502 455/41.2
2003/0035388 A1* 2/2003 Schmidt ................. H04L 63/04 370/329

(Continued)

FOREIGN PATENT DOCUMENTS

CN 1901398 A 1/2007
CN 101505475 A 8/2009

(Continued)

OTHER PUBLICATIONS

Foreign Communication From a Counterpart Application, PCT Application No. PCT/CN2012/078536, English Translation of Chinese Search Report dated Oct. 18, 2012, 2 pages.

(Continued)

*Primary Examiner* — Fred Casca
(74) *Attorney, Agent, or Firm* — Conley Rose, P.C.

(57) ABSTRACT

A communication method, a multimode terminal, a base station, and a system are disclosed, in order to implement communication based on an unlicensed band protocol standard and avoid interference to licensed users. The method includes: obtaining, by a first multimode terminal from a licensed band network, a licensed band resource that can be used in opportunistic spectrum access mode, and communicating, by the first multimode mode, with a second multimode terminal on the licensed band resource using an unlicensed band protocol standard.

16 Claims, 7 Drawing Sheets

(58) Field of Classification Search
USPC .......... 455/454, 509, 425, 435.2, 443, 418, 455/422.1, 450, 452.2, 456.2, 514, 515, 455/67.11, 561, 562.1, 63.2; 370/329, 370/252, 338, 332, 320, 328
See application file for complete search history.

(56) References Cited

U.S. PATENT DOCUMENTS

| | | | |
|---|---|---|---|
| 2009/0190537 A1* | 7/2009 | Hwang | H04L 5/0007 370/329 |
| 2010/0093360 A1 | 4/2010 | Choi et al. | |
| 2010/0272038 A1 | 10/2010 | Hamalainen et al. | |
| 2011/0125905 A1 | 5/2011 | Baucke et al. | |
| 2011/0134827 A1* | 6/2011 | Hooli | H04W 72/04 370/315 |
| 2011/0222493 A1* | 9/2011 | Mangold | H04B 1/0475 370/329 |
| 2011/0255462 A1* | 10/2011 | Jo | H04B 7/2606 370/315 |
| 2012/0252508 A1* | 10/2012 | Uusitalo | G06F 17/30902 455/500 |

FOREIGN PATENT DOCUMENTS

| | | |
|---|---|---|
| CN | 101778435 A | 7/2010 |
| WO | 2010074470 A2 | 7/2010 |

OTHER PUBLICATIONS

Foreign Communication From a Counterpart Application, PCT Application No. PCT/CN2012/078536, English Translation of Chinese Written Opinion dated Oct. 18, 2012, 11 pages.
Partial English Translation and Abstract of Chinese Patent Application No. CN101778435A, Mar. 24, 2014, 5 pages.
Foreign Communication From a Counterpart Application, Chinese Application No. 201110219913.9, Chinese Office Action dated Aug. 15, 2016, 12 pages.

* cited by examiner

COMMUNICATION METHOD, MULTIMODE TERMINAL, BASE STATION AND SYSTEM

CROSS-REFERENCE TO RELATED APPLICATIONS

This application is a continuation of International Application No. PCT/CN2012/078536, filed on Jul. 12, 2012, which claims priority to Chinese Patent Application No. 201110219913.9, filed on Aug. 2, 2011, both of which are hereby incorporated by reference in their entireties.

TECHNICAL FIELD

The present invention relates to the field of wireless communications, and in particular, to a communication method, a multimode terminal, a base station, and a system.

BACKGROUND

With swift development of communications technologies, more and more wireless applications are developed to enrich people's life and communications. Available spectrum resources that support wireless communications, however, are limited. With the increase of wireless applications, shortage of radio spectrum resources becomes more and more serious. Therefore, a major challenge to wireless communications at present is to increase utilization efficiency of the radio spectrum.

At present, allocation of the radio spectrum follows a fixed allocation pattern in all countries, where the spectrum is divided to a plurality of spectrum bands that do not overlap with one another. A spectrum band that is allocated to a specific operator for operation of a specific wireless application is called a licensed band. A spectrum band that is not licensed to a specific operator and that can be used for communication by any device compliant with requirements defined by the Radio Regulatory Committee is called an unlicensed band.

At present, long-distance communications generally use licensed bands. A common practice is to adopt an architecture consisting essentially of system devices (such as a base station, a base station controller, and a core network), where communications between user equipments (such as a mobile phone) are all forwarded by the system devices. In communications using licensed bands, communication resources are scheduled by a network in a centralized manner, which guarantees communication quality, but generally requires a high communication cost. Short-range communications, however, mostly use unlicensed bands. For communications using unlicensed bands, collision detection and avoidance techniques are generally required. When a user is using an unlicensed band, it is necessary to first check whether the spectrum band is occupied or idle, because a spectrum band can be used only when it is idle. If it is detected that the spectrum band is occupied, another check will be performed after a random time interval. Data is not transmitted until an idle spectrum band is detected, and once a communication session is completed, the channel is released immediately. In this communication mode, in the case of a large number of users and a congested spectrum band, the waiting time will be long and therefore communication quality cannot be guaranteed. The communication cost, however, is low.

As wireless services develop quickly, more and more terminals integrate multiple communication protocols. For example, many terminals integrate Wideband Code Division Multiple Access (WCDMA) and wireless broadband access (wireless local area network (WLAN), also known as Wireless Fidelity (WiFi)) protocols. In WiFi-deployed hotspot areas, users access the Internet over WiFi. In non-WiFi-deployed areas or when voice communication is needed, users access the Internet or carry out voice communication over WCDMA. Due to their low prices, unlicensed bands are used by many users so that the spectrum bands are congested. When there are too many users, normal communication requirements cannot be satisfied. In the case of licensed bands, on the other hand, because the spectrum is exclusively occupied, when there are few users, a large amount of spectrum will be idle, which is a waste of precious spectrum resources.

To solve the problem, a mechanism called opportunistic spectrum access or cognitive radio (CR) is proposed in the prior art, where a user granted with the right to use a licensed band is called a licensed user and a user not granted with the right to use a licensed band is called an unlicensed user. In opportunistic spectrum access mode, unlicensed users may use idle spectrum resources that are not occupied by licensed users. Specifically, unlicensed users can detect idle spectrum resources that are not occupied by licensed users and the detected idle spectrum resources are utilized to complete wireless communications between unlicensed users. This technology allows use of idle licensed bands, which effectively promotes the utilization efficiency of the spectrum.

The inventor of the present invention, however, discovers that the prior art has at least the following defect: the current spectrum detection is generally conducted by using energy detection to perform spectrum scanning, and a spectrum band is considered idle if its energy is below a specific threshold, and as a result, on the one hand, an unlicensed user may fail to detect a communication of a distant licensed user and hence take a spectrum band as an idle spectrum band and use it, which consequently causes interference to the communication of the licensed user; and on the other hand, because the spectrum of licensed users changes dynamically, it is possible that a spectrum band is idle at the time of detection but a licensed user initiates a communication when an unlicensed user is using the spectrum band, in which case, the unlicensed user also causes interference to the licensed user.

SUMMARY

Embodiments of the present invention provide a communication method, a multimode terminal, a base station, and a system, in order to implement communication based on unlicensed band protocol standards and avoid interference to licensed users.

A communication method provided in an embodiment of the present invention includes: obtaining, by a first multimode terminal from a licensed band network, a licensed band resource that can be used in opportunistic spectrum access mode; and communicating, by the first multimode terminal, with a second multimode terminal on the licensed band resource using an unlicensed band protocol standard.

Another communication method provided in an embodiment of the present invention includes: allocating, by a base station to a first multimode terminal, a licensed band resource for use by the first multimode terminal in opportunistic spectrum access mode; and sending, by the base station to the first multimode terminal, information about the licensed band resource for use by the first multimode terminal in opportunistic spectrum access mode.

A multimode terminal provided in an embodiment of the present invention includes: a licensed band resource obtaining unit configured to obtain from a licensed band network a licensed band resource that can be used in opportunistic spectrum access mode; and an unlicensed band protocol standard communication unit configured to communicate with a second multimode terminal on the licensed band resource using an unlicensed band protocol standard.

A base station provided in an embodiment of the present invention includes: a licensed band resource allocating unit configured to allocate a licensed band resource for use by a first multimode terminal in opportunistic spectrum access mode to the first multimode terminal; and a licensed band resource sending unit configured to send, to the first multimode terminal information, about the licensed band resource for use by the first multimode terminal in opportunistic spectrum access mode, where the licensed band resource is used for the first multimode terminal to communicate with a second multimode terminal using an unlicensed band protocol standard.

A communication system provided in an embodiment of the present invention includes a first multimode terminal, a base station, and a subscriber data center, where: the first multimode terminal is configured to obtain from a licensed band network a licensed band resource that can be used in opportunistic spectrum access mode, and communicate with a second multimode terminal on the licensed band resource using an unlicensed band protocol standard; and subscribe to an opportunistic spectrum access service with the subscriber data center; the base station is configured to send, to the subscriber data center, a request for querying whether the first multimode terminal has subscribed to the opportunistic spectrum access service, receive an opportunistic spectrum access license state of the first multimode terminal returned by the subscriber data center, and if the opportunistic spectrum access license state of the first multimode terminal indicates that the first multimode terminal has subscribed to the opportunistic spectrum access service, allocate a licensed band resource to the first multimode terminal and send information about the licensed band resource to the first multimode terminal; and the subscriber data center is configured to record whether the first multimode terminal has subscribed to the opportunistic spectrum access service; and receive from the base station the request for querying whether the first multimode terminal has subscribed to the opportunistic spectrum access service and return the opportunistic spectrum access license state of the first multimode terminal.

A communication system provided in an embodiment of the present invention includes a base station and a subscriber data center, where: the base station is configured to allocate a licensed band resource for use by a first multimode terminal in opportunistic spectrum access mode to the first multimode terminal, where the first multimode terminal can communicate with a second multimode terminal on the licensed band resource using an unlicensed band protocol standard; the subscriber data center is configured to record whether the first multimode terminal has subscribed to an opportunistic spectrum access service; the base station is further configured to send, to the subscriber data center, a request for querying whether the first multimode terminal has subscribed to an opportunistic spectrum access service, and the subscriber data center is further configured to receive from the base station the request for querying whether the first multimode terminal has subscribed to the opportunistic spectrum access service and return an opportunistic spectrum access license state of the first multimode terminal; and the base station is further configured to receive the opportunistic spectrum access license state of the first multimode terminal returned by the subscriber data center, and if the opportunistic spectrum access license state of the first multimode terminal indicates that the first multimode terminal has subscribed to the opportunistic spectrum access service with the subscriber data center, allocate the licensed band resource to the first multimode terminal and send information about the licensed band resource to the first multimode terminal.

From the above technical solution, it is obvious that the embodiments of the present invention provide the following benefits:

In the embodiments of the present invention, a first multimode terminal obtains from a licensed band network a licensed band resource that can be used in opportunistic spectrum access mode, and then communicates with a second multimode terminal on the licensed band resource using an unlicensed band protocol standard, which implements communication based on an unlicensed band protocol standard and increases utilization efficiency of licensed bands. Because the licensed band resource used by the first multimode terminal is allocated by the licensed band network to implement opportunistic spectrum access, and is not decided by an unlicensed user, interference caused by an unlicensed user to a licensed user can be avoided.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a communication method, a multimode terminal, a base station, and a system, in order to implement communication based on an unlicensed band protocol standard and avoid interference to licensed users. It should be noted that both a licensed user and an unlicensed user in the background and embodiments of the present invention refer to a user equipment (UE), and therefore, a user in the embodiments of the present invention should be understood as a communication device rather than a specific person, where the user equipment includes but is not limited to various types of communication terminals. In various types of communication terminals, a multimode terminal may be a terminal that is compatible with multiple standards, and a first multimode terminal in the embodiments of the present invention is compatible with both licensed band protocol standards and unlicensed band protocol standards. For example, a terminal referred to in the embodiments of the present invention is compatible with the long term evolution (LTE) standard and short-range communication protocol.

To make the objectives, features, and advantages of the present invention more comprehensible, the following clearly describes the technical solution in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
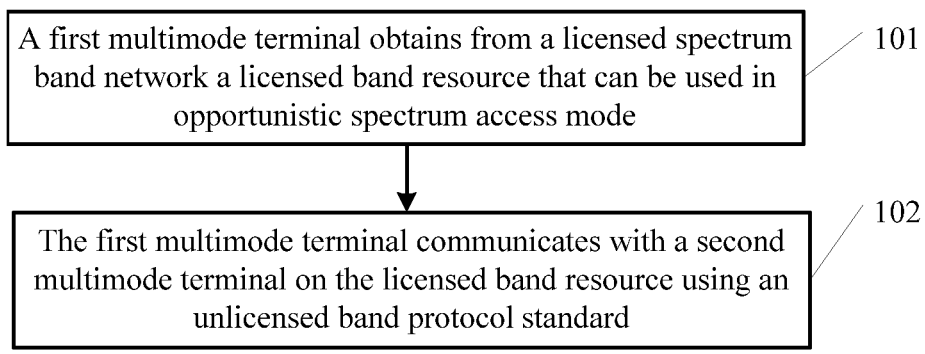
FIG. 1 is a schematic diagram of a communication method according to an embodiment of the present invention.

As shown in FIG. 1, a communication method provided in an embodiment of the present invention includes the following steps:

101. A first multimode terminal obtains from a licensed band network a licensed band resource that can be used in opportunistic spectrum access mode.

In the embodiment of the present invention, the first multimode terminal integrates multiple communication protocols, where these communication protocols are categorized to two types. One type of communication protocols are licensed band communication protocol standards, referred to briefly as licensed band protocol standards, where a licensed band is allocated to a specific licensed band network for communication use, and generally used by a long-distance communications network. For example, supported licensed band communication protocol standards include: a global system for mobile communications (GSM) protocol standard, a code division multiple access (CDMA) 2000 protocol standard, a WCDMA protocol standard, a high speed packet access evolution (HSPA+) protocol standard, an LTE protocol standard, a long term evolution-advanced (LTE-A) protocol standard, an 802.16e protocol standard, an 802.16m protocol standard, and a worldwide interoperability for microwave access (WiMax) protocol standard. The first multimode terminal in the embodiment of the present invention may specifically support one or more of the licensed band communication protocol standards. The licensed band network is based on a licensed band protocol standard. The licensed band network may include an access network serving node and the licensed band network has the right to use band resources licensed thereto. The other type of communication protocols are unlicensed band communication protocol standards, referred to briefly as unlicensed band protocol standards, where an unlicensed band is normally not allocated to a specific network and can be used by any network that satisfies a predefined requirement. For example, supported unlicensed band communication protocol standards include: a WiFi protocol standard, a bluetooth protocol standard, and an 802.15.4 (Zigbee) protocol standard. The first multimode terminal in the embodiment of the present invention may specifically support one or more of the unlicensed band communication protocol standards.

In the embodiment of the present invention, in a specific implementation manner of the first multimode terminal that supports both a licensed band communication protocol standard and an unlicensed band communication protocol standard, a licensed band communication module (equivalent to a licensed user in the prior art) and an unlicensed band communication module (equivalent to an unlicensed user in the prior art) may be built in the first multimode terminal. The opportunistic spectrum access mode in the embodiment of the present invention is that the unlicensed band communication module in the first multimode terminal carries out communication by using a licensed band resource obtained by the licensed band communication module from the licensed band network. The first multimode terminal obtains a licensed band resource from a licensed band network, which is different from the prior art where an unlicensed user measures idle state of a licensed user actively and which can avoid misjudgment of the unlicensed user, and therefore avoid interference from an unlicensed user to a licensed user. The first multimode terminal may specifically obtain the licensed band resource from a base station in the licensed band network. In the embodiment of the present invention, a multimode terminal can use a licensed band resource in opportunistic spectrum access mode, which indicates that the multimode terminal is capable of using the licensed band resource.

It should be noted that, in the embodiment of the present invention, before step 101, the method may further include that the first multimode terminal and a second multimode terminal exchange capabilities with each other. For example, the first multimode terminal and the second multimode terminal may exchange capabilities with each other in an unlicensed band network. The capabilities exchanged may include which communication protocol standards are supported and whether the capability of using a licensed band resource in opportunistic spectrum access mode is supported.

In the embodiment of the present invention, the method may further include that the first multimode terminal negotiates with the second multimode terminal about entry to an opportunistic spectrum access communication mode. In a practical application, a most preferred working band of both the first multimode terminal and the second multimode terminal is an unlicensed band, and when the multimode terminals find that the unlicensed band is congested, the two parties that need to communicate can negotiate with each other about entry to an opportunistic spectrum access communication mode, or the multimode terminals enter an opportunistic spectrum access communication mode directly through manual setting.

The two communicating multimode terminals may each request the licensed band network to allocate a licensed band resource for opportunistic spectrum access. Or, one of the multimode terminals requests a licensed band resource with the licensed band network, in which case, the multimode terminal needs to send the licensed band network information that indicates subscriber identities of all multimode terminals that will use the licensed band resource, for example, media access control (MAC) addresses of the multimode terminals or international mobile subscriber identities (IMSI) of the multimode terminals.

In another optional solution, before step 101, the first multimode terminal subscribes to an opportunistic spectrum access service with a subscriber data center, which means that the first multimode terminal has applied for opening the function of using opportunistic spectrum access. A base station, before allocating a licensed band resource to the first multimode terminal, will query the subscriber data center whether the first multimode terminal has applied for opening the function of using opportunistic spectrum access. If the first multimode terminal has not subscribed to the opportunistic spectrum access service with the subscriber data center, the first multimode terminal will be rejected to be allocated a licensed band idle resource and/or a licensed band resource preset by the base station and dedicated to use in opportunistic spectrum access mode, so as to avoid free-will occupation of licensed band resources and impacts on communication of the licensed band communication network. In this case, the capabilities exchanged by the first multimode terminal and the second multimode terminal further include whether a license of the subscriber data center for opportunistic spectrum access is obtained. In a practical application, the subscriber data center may specifically be a home location register (HLR), a visitor location register (VLR), a mobility management entity (MME), or the like.

In the embodiment of the present invention, when the first multimode terminal obtains from a licensed band network a licensed band resource that can be used in opportunistic spectrum access mode, the following manners may be adopted.

The first multimode terminal receives a licensed band idle resource and/or a licensed band resource preset by a base station in the licensed band network and dedicated to use in opportunistic spectrum access mode, which are notified by the base station. In a specific implementation manner, the base station in the licensed band network may broadcast licensed band idle resources and/or licensed band resources dedicated to use in opportunistic spectrum access mode, for detection by multimode terminals in need of opportunistic spectrum access, where the licensed band resources dedicated to use in opportunistic spectrum access mode are a portion of or all specific licensed bands preset by the base station among all licensed bands within a period of time, where the preset resources are dedicated to use in opportunistic spectrum access mode.

In a specific implementation manner, the first multimode terminal may receive, on a licensed band by using a protocol format compatible with a licensed band protocol standard, licensed band idle resource information or opportunistic spectrum access resource information on a licensed band, sent by the base station in the licensed band network.

In the embodiment of the present invention, when the first multimode terminal obtains from the licensed band network a licensed band resource that can be used in opportunistic spectrum access mode, the following manner may alternatively be adopted.

First, the first multimode terminal requests, with a base station in the licensed band network, a licensed band idle resource and/or a licensed band resource preset by the base station and dedicated to use in opportunistic spectrum access mode; and then, the first multimode terminal receives a licensed band idle resource and/or a licensed band resource preset by the base station in the licensed band network and dedicated to use in opportunistic spectrum access mode, which are notified by the base station. In a specific implementation manner, the base station in the licensed band network may broadcast licensed band idle resources and/or licensed band resources dedicated to use in opportunistic spectrum access mode, for detection by multimode terminals in need of opportunistic spectrum access, where the licensed band resources dedicated to use in opportunistic spectrum access mode are a portion of or all specific licensed bands preset by the base station among all licensed bands within a period of time, where the preset resources are dedicated to use in opportunistic spectrum access mode.

In a specific implementation manner, the first multimode terminal sends, on a licensed band by using a protocol format compatible with a licensed band protocol standard, licensed band idle resource request information to the base station in the licensed band network, and the base station allocates, according to the request information, a licensed band resource to the first multimode terminal and sends the allocated licensed band resource to the first multimode terminal.

102. The first multimode terminal communicates with a second multimode terminal on the licensed band resource using an unlicensed band protocol standard.

In the embodiment of the present invention, after the first multimode terminal obtains a licensed band resource from the licensed band network, the first multimode terminal sends communication data to a second multimode terminal on the licensed band resource using an unlicensed band protocol standard, and receives communication data from the second multimode terminal on the licensed band resource using the unlicensed band protocol standard, thereby implementing communication between the first multimode terminal and the second multimode terminal. The second multimode terminal in the embodiment of the present invention may be a terminal of the same type as the first multimode terminal in step 101. For example, the second multimode terminal may integrate multiple communication protocol standards, one type of the communication protocol standards is communication protocol standards that support a licensed band, and the other type of the communication protocol standards is communication protocol standards that support an unlicensed band. In a practical application, a licensed band communication module and an unlicensed band communication module may be built in the second multimode terminal, in order to use a licensed band resource in the opportunistic spectrum access manner. Alternatively, the second multimode terminal may be a terminal or an access point where a baseband unit supports only unlicensed band communication protocol standards but a radio frequency unit supports both licensed bands and unlicensed bands.

It should be noted that, in the embodiment of the present invention, after the first multimode terminal completes the communication with the second multimode terminal, or after the first multimode terminal determines to exit the opportunistic spectrum access mode, an optional solution is that the first multimode terminal sends a notification message to the licensed band network, where the notification message is used to indicate that the first multimode terminal has exited the opportunistic spectrum access communication mode, so that the licensed band network stops allocation of the licensed band resource to the first multimode terminal or that the licensed band network is triggered to record time information of use of the licensed band resource by the first multimode terminal in opportunistic spectrum access mode and/or size information of the licensed band resource.

In the embodiment of the present invention, the first multimode terminal obtains from the licensed band network a licensed band resource that can be used in opportunistic spectrum access mode, and then communicates with the second multimode terminal on the licensed band resource using an unlicensed band protocol standard, which implements communication based on an unlicensed band protocol standard and increases utilization efficiency of licensed bands. Because the licensed band resource used by the first multimode terminal is allocated by the licensed band network to implement opportunistic spectrum access, and is not decided by an unlicensed user, interference caused by the unlicensed user to a licensed user can be avoided. Furthermore, the licensed band for opportunistic spectrum access bears an unlicensed band communication protocol standard, which spares the need to develop a new opportunistic spectrum access communication standard and avoids the complexity of implementation of a terminal caused by bearing a new opportunistic spectrum access communication protocol standard.

Figure 2:
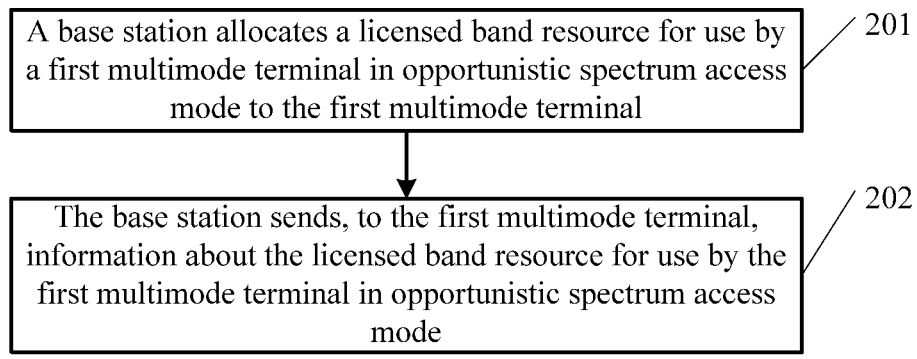
FIG. 2 is a schematic diagram of another communication method according to an embodiment of the present invention.

In the above embodiment, the communication method provided in the embodiment of the present invention is described from the perspective of a multimode terminal, and hereinafter, a communication method provided in an embodiment of the present invention will be described from the perspective of a base station. As shown in FIG. 2, the method includes the following steps:

201. A base station allocates a licensed band resource for use by a first multimode terminal in opportunistic spectrum access mode to the first multimode terminal.

In the embodiment of the present invention, a base station allocates to a first multimode terminal a licensed band resource for use by the first multimode terminal in opportunistic spectrum access mode. In a practical application, when the base station performs resource scheduling, the base station may allocate an idle resource except those for services of licensed users, so that the first multimode terminal uses the licensed band resource in opportunistic spectrum access mode. Or, the base station allocates the first multimode terminal a licensed band resource where interference to communication of a licensed user is not significant, which means that the licensed user and the opportunistic spectrum access user share the licensed band resource.

In a practical application of the embodiment of the present invention, the base station may broadcast licensed band idle resources or licensed band resources dedicated to use in opportunistic spectrum access mode periodically or not periodically, and any multimode terminal can use these licensed band resources in opportunistic spectrum access mode, rather than that the base station allocates a licensed band resource to a specific multimode terminal.

In another practical application of the embodiment of the present invention, the first multimode terminal sends, to the base station, a licensed band idle resource request or a request for a licensed band resource dedicated to use in opportunistic spectrum access mode, and after the base station receives the request, the base station allocates the first multimode terminal a licensed band idle resource or a licensed band resource preset by the base station and dedicated to use in opportunistic spectrum access mode.

In a practical application, if the base station does not have an idle resource except those for services of licensed users, or a licensed band resource where interference to commutation of a licensed user is not significant, to allocate to the first multimode terminal, the base station rejects to allocate a licensed band resource for use by the first multimode terminal in opportunistic spectrum access mode to the first multimode terminal.

It should be noted that, in the embodiment of the present invention, in a scenario where the first multimode terminal has subscribed to an opportunistic spectrum access service with a subscriber data center, another optional implementation manner is: after the base station receives from the first multimode terminal the licensed band idle resource request and/or the request for a licensed band resource dedicated to use in opportunistic spectrum access mode, the base station obtains an opportunistic spectrum access license state of the first multimode terminal from the subscriber data center, and if the opportunistic spectrum access license state indicates that the first multimode terminal has not subscribed to an opportunistic spectrum access service with the subscriber data center, the base station rejects the licensed band idle resource request and/or the request for a licensed band resource dedicated to use in opportunistic spectrum access mode from the first multimode terminal, or if the opportunistic spectrum access license state indicates that the first multimode terminal has subscribed to an opportunistic spectrum access service with the subscriber data center, the base station initiates an operation to notify the first multimode terminal of a licensed band resource. In a practical application, the subscriber data center may specifically be a home location register or a mobility management entity.

In a practical application, the licensed band resource allocated by the base station to the first multimode terminal may have multiple forms, namely, a dynamically configured licensed band resource, a semi-statically configured licensed band resource, a periodically configured licensed band resource, or a licensed band resource configured according to a one-off trigger. These forms will be described in detail with the following examples.

Dynamically configured licensed band resource: The dynamically configured licensed band resource is one that is updated quickly. For example, in an LTE network, the allocated licensed band resource can be updated every 1 millisecond (ms). The dynamically configured licensed band resource may be carried by physical layer signaling, for example on a physical downlink control channel (PDCCH) of the LTE communication protocol.

Semi-statically configured licensed band resource: The semi-statically configured licensed band resource is one that is updated slowly, for example, at intervals of above 5 ms. The semi-statically configured licensed band resource may be configured by using MAC signaling or radio resource control (RRC) signaling.

Periodically configured licensed band resource: The periodically configured licensed band resource is one that changes at a specific interval. For example, the base station may allocate the $100^{th}$ to $110^{th}$ resource blocks (RBs) of each subframe as licensed band resources that can be used in opportunistic spectrum access mode, or the base station may allocate all RBs in the $2^{nd}$ ms of each 4 ms as licensed band resources that can be used in opportunistic spectrum access mode, or the base station may allocate the $90^{th}$ to $100^{th}$ RBs of the $2^{nd}$ ms of each 4 ms as licensed band resources that can be used in opportunistic spectrum access mode.

Licensed band resource configured according to a one-off trigger: The licensed band resource configured according to a one-off trigger is one that is valid in only a predefined limited period of time, for example, within only 4 ms, and that cannot be used after this period of time.

In a practical application, the licensed band resource allocated by the base station to the first multimode terminal may be continuous or non-continuous. That is, the licensed band resource allocated by the base station may be a continuous spectrum band or a non-continuous spectrum band.

In a practical application, the licensed band resource allocated by the base station to the first multimode terminal may be a portion of or all licensed band resources within a period of time.

202. The base station sends, to the first multimode terminal, information about the licensed band resource for use by the first multimode terminal in opportunistic spectrum access mode.

After allocating the licensed band resource to the first multimode terminal, the base station sends the information about the resource to the first terminal, so that the first multimode terminal uses the licensed band resource to communicate with the second multimode terminal.

It should be noted that the licensed band resource information is used to indicate the licensed band resource allocated to the first multimode terminal, and after the first multimode terminal receives the licensed band resource information, the first multimode terminal can obtain the licensed band resource allocated by the base station.

In the embodiment of the present invention, the base station sends, to the first multimode terminal, information about a licensed band resource that can be used in an unlicensed band protocol standard. In a practical application, a licensed band communication module and an unlicensed band communication module may be built in the first multimode terminal, and the base station may send the licensed band resource to the licensed band communication module of the first multimode terminal, and the licensed band communication module of the first multimode terminal sends the licensed band resource allocated by the base station to the unlicensed band communication module of the first multimode terminal, so as to implement the function that the unlicensed band communication module of the first multimode terminal uses the licensed band resource to communicate.

It should be noted that, in a practical application, the base station may send the licensed band resource information to the first multimode terminal by using physical layer signaling or high layer signaling. For example, when a licensed band communication protocol supported by the first multimode terminal is LTE, the physical layer signaling of the base station may be PDCCH signaling, where the PDCCH signaling carries the information about the licensed band resource that can be used in opportunistic spectrum access mode. The high layer signaling used by the base station may be high layer RRC connection setup signaling, where the signaling carries the information about the licensed band resource that can be used in opportunistic spectrum access mode; or, the high layer signaling may be RRC configuration signaling, RRC reconfiguration signaling, or RRC connection re-setup signaling. The form of high layer signaling is described but not limited herein.

In a practical application, the base station may send the licensed band resource information to the first multimode terminal in different implementation manners. For example:

The base station notifies the first multimode terminal, by means of unicast, of the information about the licensed band resource for use by the first multimode terminal in opportunistic spectrum access mode, where unicast means that the signaling can be received by only a specific terminal (in the embodiment of the present invention, specifically, the first multimode terminal). For example, the licensed band resource that can be used in opportunistic spectrum access mode may be transmitted on a PDCCH that is scrambled using a special radio network temporary identity (RNTI) and only an authorized terminal (the first multimode terminal) is notified of the RNTI, and therefore, only the authorized first multimode terminal can obtain the licensed band resource for use in opportunistic spectrum access mode. To prevent other unauthorized terminals from using the licensed band resource, the base station may further update the RNTI used to transmit the licensed band resource for use in opportunistic spectrum access mode in a regular or irregular manner, and every time when the RNTI is updated, the base station notifies only the authorized first terminal of the RNTI value.

Or, the base station sends signaling to all terminals served by a network device by means of broadcast, where the signaling includes the licensed band resource information, and broadcast means that all terminals served by the network device can receive the signaling.

Or, the base station notifies the first multimode terminal, by means of multicast, of the information about the licensed band resource for use by the first multimode terminal in opportunistic spectrum access mode, where multicast means that all one or more terminals requesting opportunistic spectrum access form one or more opportunistic spectrum access terminal groups and all users in the group (including the first multimode terminal in the embodiment of the present invention) can receive the signaling.

It should be noted that, in the embodiment of the present invention, after the first multimode terminal exits the opportunistic spectrum access communication mode, for example, after the first multimode terminal completes the communication with the second multimode terminal, the first multimode terminal may further send a notification message to the base station, where the notification message is used to indicate that the first multimode terminal has exited the opportunistic spectrum access communication mode, and after receiving the notification message, the base station stops allocation of a licensed band resource to the first multimode terminal so that a band is idle and can be allocated to another multimode terminal, which increases utilization efficiency of the network.

In another optional solution, after receiving the notification message, the base station records time information of use of the licensed band resource by the first multimode terminal in opportunistic spectrum access mode and/or size information of the licensed band resource, and further sends the time information of the use of the licensed band resource by the first multimode terminal in opportunistic spectrum access mode and/or the size information of the licensed band resource to the subscriber data center, so that the subscriber data center implements charging on the first multimode terminal.

In another optional solution, if the first multimode terminal is handed over, the base station sends information that the first multimode terminal works in opportunistic spectrum access mode to a target base station, so that the target base station allocates the first multimode terminal a licensed band resource for use by the first multimode terminal in opportunistic spectrum access mode.

In the embodiment of the present invention, the base station allocates a licensed band resource that can be used in opportunistic spectrum access mode to the first multimode terminal, and then the base station sends, to the first multimode terminal, information about the licensed band resource for use by the first multimode terminal in opportunistic spectrum access mode, so that the first multimode terminal can communicate with a second multimode terminal on the licensed band resource using an unlicensed band protocol standard. This implements communication based on an unlicensed band protocol standard and increases utilization efficiency of licensed bands. Because the licensed band resource used by the first multimode terminal is allocated by the base station to the first multimode terminal and is not decided by an unlicensed user, interference caused by an unlicensed user to a licensed user can be avoided.

In the above embodiments, the method provided in the embodiments of the present invention is described and communication devices that use the communication method, such as a multimode terminal, a base station, and a communication system, provided in the embodiments of the present invention will be described hereinafter.

Figure 3:
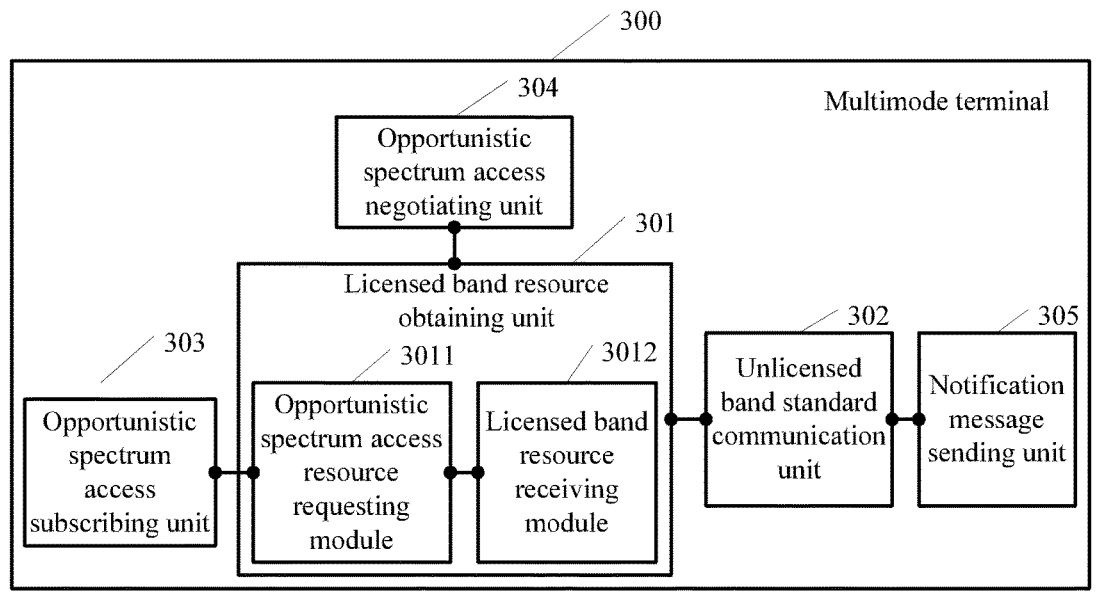
FIG. 3 is a schematic diagram of a multimode terminal according to an embodiment of the present invention.

As shown in FIG. 3, a multimode terminal 300 provided in an embodiment of the present invention, which is also referred to herein as a first multimode terminal, includes: a licensed band resource obtaining unit 301 configured to obtain from a licensed band network a licensed band resource that can be used in opportunistic spectrum access mode; and an unlicensed band protocol standard communication unit 302 configured to communicate with a second multimode terminal on the licensed band resource using an unlicensed band protocol standard.

In the embodiment of the present invention, the multimode terminal 300 integrates both a licensed band communication protocol standard and an unlicensed band communication protocol standard, and specifically, the multimode terminal 300 in the embodiment of the present invention may support one or more licensed band communication protocol standards. The licensed band network is based on a licensed band protocol standard. The licensed band network may include an access network serving node and the licensed band network has the right to use band resources licensed thereto. The multimode terminal 300 in the embodiment of the present invention may specifically support one or more unlicensed band protocol standards.

The licensed band resource obtaining unit 301 may be a processor and specifically a licensed band communication unit, for example, an LTE baseband processing unit. The unlicensed band protocol standard communication unit 302 may be another processor, for example, a WiFi processing unit.

In a practical application, in an optional implementation manner, the multimode terminal 300 may further include: an opportunistic spectrum access subscribing unit 303 configured to subscribe to an opportunistic spectrum access service with a subscriber data center and trigger the licensed band resource obtaining unit 301. That the multimode terminal 300 has subscribed to an opportunistic spectrum access service with a subscriber data center means that the multimode terminal 300 has applied for opening the function of using opportunistic spectrum access. A base station, before allocating a licensed band resource to the multimode terminal 300, will query the subscriber data center whether the multimode terminal 300 has applied for opening the function of using opportunistic spectrum access. If the multimode terminal 300 has not subscribed to the opportunistic spectrum access service with the subscriber data center, the multimode terminal 300 will be rejected to be allocated a licensed band idle resource and/or a licensed band resource preset by the base station and dedicated to use in opportunistic spectrum access mode, so as to avoid free-will occupation of licensed band resources and impacts on communication of the licensed band network.

According to the embodiment of the present invention, in a practical application, in an optional implementation manner, the multimode terminal 300 may further include: an opportunistic spectrum access negotiating unit 304 configured to negotiate with the second multimode terminal about entry to an opportunistic spectrum access communication mode. In a practical application, a most preferred working band of both the multimode terminal 300 and the second multimode terminal is an unlicensed band, and when the multimode terminal 300 finds that the unlicensed band is congested, the two parties that need to communicate can negotiate with each other about entry to the opportunistic spectrum access communication mode, or the multimode terminals enter the opportunistic spectrum access communication mode directly through manual setting.

In a practical application, the licensed band resource obtaining unit 301 may include: an opportunistic spectrum access resource requesting module 3011 configured to request, with a base station in the licensed band network, a licensed band idle resource and/or a licensed band resource dedicated to use in opportunistic spectrum access mode; and a licensed band resource receiving module 3012 configured to receive a licensed band idle resource and/or a license band resource preset by the base station in the licensed band network and dedicated to use in opportunistic spectrum access mode, which are notified by the base station.

In a practical application, in another implementation manner, the licensed band resource obtaining unit 301 may include the licensed band resource receiving module 3012, but not include the opportunistic spectrum access resource requesting module 3011. The licensed band resource receiving module 3012 is configured to receive a licensed band idle resource or a license band resource preset by the base station in the licensed band network and dedicated to use in opportunistic spectrum access mode, which is notified by the base station. In this case, the multimode terminal 300 does not include an opportunistic spectrum access resource requesting module 3011 and the multimode terminal 300 does not need to request a licensed band resource with the base station, but instead, the base station may send a licensed band resource to the multimode terminal 300 directly.

According to the embodiment of the present invention, in a practical application, in an optional implementation manner, the multimode terminal 300 may further include: a notification message sending unit 305 configured to send a notification message to the licensed band network, where the notification message is used to indicate that the multimode terminal 300 has exited the opportunistic spectrum access communication mode, so that the licensed band network stops allocation of a licensed band resource to the multimode terminal 300 or the licensed band network is triggered to record time information of use of the licensed band resource by the multimode terminal 300 in opportunistic spectrum access mode and/or size information of the licensed band resource.

In the above embodiment, only structural relationships among units and modules are described. For execution of the units and modules in a practical application, refer to the method illustrated in FIG. 1, which will not be described here further.

In the embodiment of the present invention, the licensed band resource obtaining unit 301 obtains from the licensed band network a licensed band resource that can be used in opportunistic spectrum access mode, and then the unlicensed band protocol standard communication unit 302 communicates with a second multimode terminal on the licensed band resource using an unlicensed band protocol standard, which implements communication based on an unlicensed band protocol standard and increases utilization efficiency of licensed bands. Because the licensed band resource used by the first multimode terminal is allocated by the licensed band network to implement opportunistic spectrum access, and is not decided by an unlicensed user, interference caused by an unlicensed user to a licensed user can be avoided.

Figure 4:
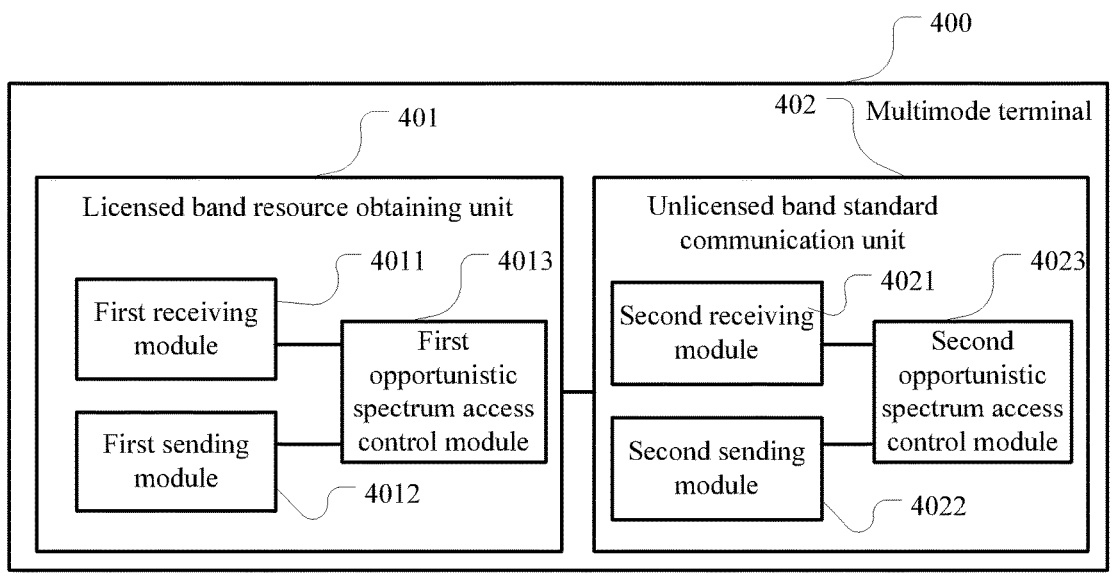
FIG. 4 is a schematic diagram of another multimode terminal according to an embodiment of the present invention.

In a specific application scenario, as shown in FIG. 4, a multimode terminal 400 in an embodiment of the present invention, which is also referred to as a first multimode terminal, includes: a licensed band resource obtaining unit 401 which includes a first receiving module 4011, a first sending module 4012, and a first opportunistic spectrum access control module 4013, and an unlicensed band protocol standard communication unit 402 which includes a second receiving module 4021, a second sending module 4022, and a second opportunistic spectrum access control module 4023. The licensed band resource obtaining unit 401 may be a processor, for example, an LTE baseband processor. The unlicensed band protocol standard communication unit 402 may be a processor, for example, a WiFi processor. The first opportunistic spectrum access control module 4013 and the second opportunistic spectrum access control module 4023 are configured to implement control and scheduling of opportunistic spectrum access.

The licensed band resource obtaining unit 401 can implement communication functions compliant with a licensed band communication protocol standard, where the first receiving module 4011 and the first sending module 4012 are respectively configured to implement functions of receiving and sending signals. The licensed band resource obtaining unit 401 can obtain, from a licensed band resource controller (such as a base station), information (time, frequency, and so on) about a licensed band resource that can be used in opportunistic spectrum access mode. The first opportunistic spectrum access control module 4013 may be a processor configured to judge whether to activate an opportunistic spectrum access mode. A judgment criterion of the first opportunistic spectrum access control module 4013 may be that the opportunistic spectrum access mode is activated when a manual instruction from a user is received or when network congestion is detected. After determining that the opportunistic spectrum access mode is activated, the first opportunistic spectrum access control module 4013 controls the first receiving module 4011 to obtain a resource that can be used for communication in opportunistic spectrum access mode from the licensed band network, and the first opportunistic spectrum access control module 4013 controls the first sending module 4012 to send the licensed band resource to the unlicensed band protocol standard communication unit 402. After determining that the opportunistic spectrum access communication mode is activated, the first opportunistic spectrum access control module 4013 may further control the first receiving module 4011 to receive from the unlicensed band protocol standard communication unit 402 a licensed band idle resource request and/or a request for a licensed band resource dedicated to use in opportunistic spectrum access mode, and the first opportunistic spectrum access control module 4013 controls the first sending module 4012 to send a request signal to the licensed band network, requesting the licensed band network to allocate a licensed band idle resource request and/or a licensed band resource dedicated to use in opportunistic spectrum access mode.

The unlicensed band protocol standard communication unit 402 can implement a communication function compliant with an unlicensed band communication protocol standard, and the second receiving module 4021 and the second sending module 4022 are configured to implement functions of receiving and sending signals. Further, the unlicensed band protocol standard communication unit 402 can receive and send signals on a licensed band. The second opportunistic spectrum access control module 4023 may be a processor configured to judge whether to activate an opportunistic spectrum access mode. A judgment criterion of the second opportunistic spectrum access control module 4023 may be that the opportunistic spectrum access mode is activated when a manual instruction from a user is received or when network congestion is detected. After the opportunistic spectrum access mode is activated, the second opportunistic spectrum access control module 4023 controls the second receiving module 4021 to obtain a resource that can be used for communication in opportunistic spectrum access mode from the licensed band resource obtaining unit 401, the second opportunistic access control module 4023 controls the second sending module 4022 to send communication data to the second multimode terminal, and the second opportunistic access control module 4023 controls the second receiving module 4021 to receive the communication data from the second multimode terminal. After determining that the opportunistic spectrum access communication mode is activated, the second opportunistic spectrum access module 4023 may further control the second sending module 4022 to send, to the licensed band resource obtaining unit 401, the licensed band idle resource request and/or the request for a licensed band resource dedicated to use in opportunistic spectrum access mode.

According to one hardware layout, the licensed band resource obtaining unit 401 includes a licensed band communication standard receipt digital processing module, an analog-digital convertor, a licensed band receipt radio frequency channel, a licensed band communication standard transmission digital processing module, a digital-analog convertor, a licensed band transmission radio frequency channel, and a licensed band antenna module. The unlicensed band protocol standard communication unit 402 includes an unlicensed band communication standard receipt digital processing module, an analog-digital convertor, an unlicensed band receipt radio frequency channel, an unlicensed band communication standard transmission digital processing module, a digital-analog convertor, an unlicensed band transmission radio frequency channel, and an unlicensed band antenna module. The licensed band resource obtaining unit 401 and the unlicensed band protocol standard communication unit 402 implement baseband signal processing based on the above hardware layout.

Figure 5:
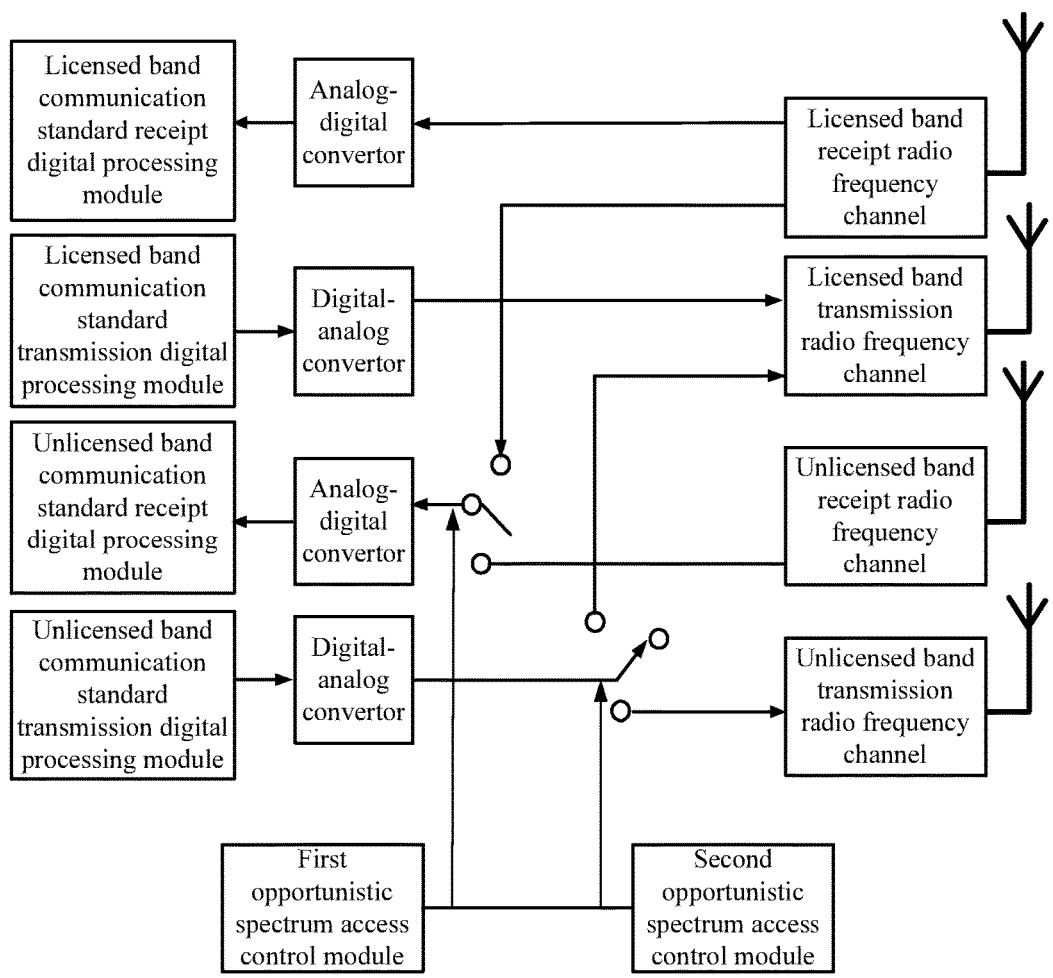
FIG. 5 is a schematic diagram of another multimode terminal according to an embodiment of the present invention.

Optionally, the licensed band antenna module and the unlicensed band antenna module may further be set in the physical module. The analog-digital convertors and digital-analog convertors of the licensed band and unlicensed band modules may be set in the physical module. Further, in the opportunistic spectrum access mode, the first opportunistic spectrum access control module 4013 and the second opportunistic spectrum access control module 4023 control the unlicensed band receipt digital processing module to connect to the licensed band receipt digital processing module, and the unlicensed band transmission digital processing channel to connect to the licensed band transmission digital processing channel, as shown in FIG. 5. It is apparent that the unlicensed band receipt digital processing module may be connected to either one of the licensed band transmission radio frequency channel or the unlicensed band transmission radio frequency channel by using a switch, thereby implementing switching between different transmission channels. When the unlicensed band transmission digital processing module is connected to the licensed band transmission radio frequency channel, the unlicensed band transmission digital processing module uses a licensed band to perform communication based on an unlicensed band protocol standard.

Figure 6:
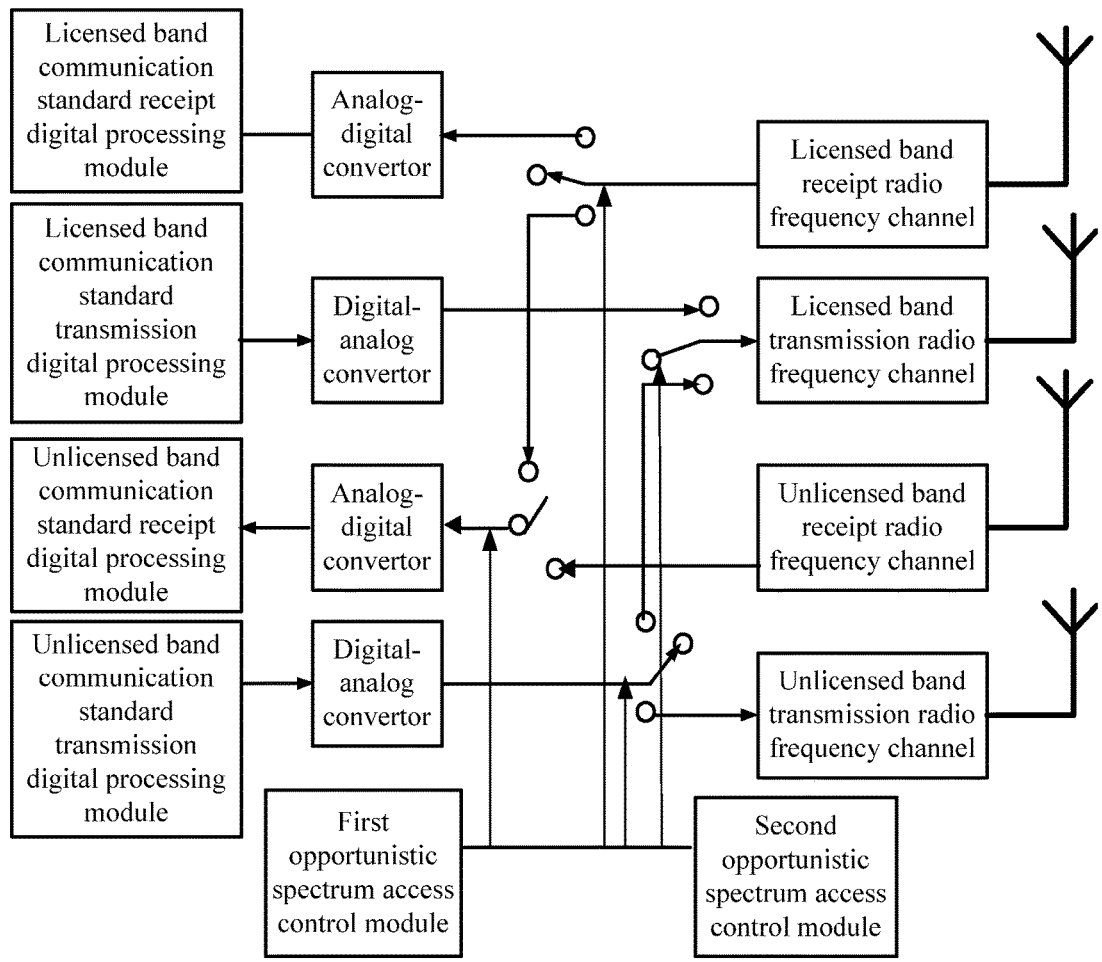
FIG. 6 is a schematic diagram of another multimode terminal according to an embodiment of the present invention.
Figure 7:
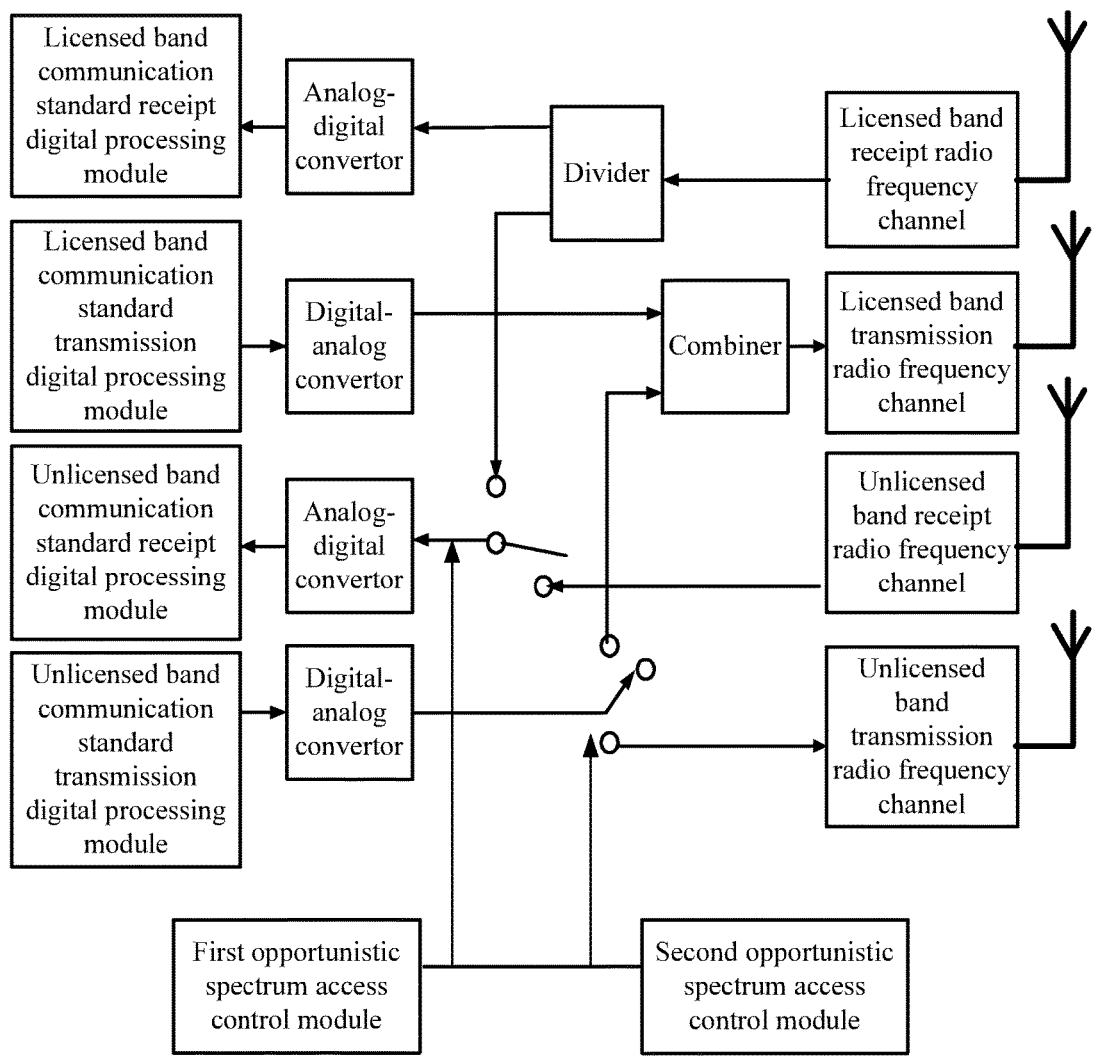
FIG. 7 is a schematic diagram of another multimode terminal according to an embodiment of the present invention.

In the opportunistic spectrum access mode, the licensed band receipt radio frequency channel and the licensed band transmission radio frequency channel may be occupied exclusively by the unlicensed band communication protocol receipt (transmission) digital processing module, and used to process communication data. This means that there is no communication signal between the multimode terminal and the licensed band network, or that a signal from the unlicensed band communication protocol receipt (transmission) digital processing module and a signal from the licensed band communication protocol receipt (transmission) digital processing module may share the licensed band radio frequency channel. It may be implemented by using a switch whether the unlicensed band communication protocol receipt (transmission) digital processing module shares a radio frequency channel with the licensed band communication protocol receipt (transmission) digital processing module. One implementation manner of the former is illustrated in FIG. 6, where the first opportunistic spectrum access control module 4013 and the second opportunistic spectrum access control module 4023 control by using a switch whether the licensed band receipt (transmission) radio frequency channel is connected to a signal of the unlicensed band communication protocol receipt (transmission) digital processing module or a signal of the licensed band communication protocol receipt (transmission) digital processing module. One implementation manner of the latter is illustrated in FIG. 7, where a divider is added to the receipt channel to separate two signals and a combiner is added to the transmission channel to combine two signals, the first opportunistic spectrum access control module 4013 and the second opportunistic spectrum access control module 4023 control by using a switch whether the signal of the unlicensed band receipt (transmission) radio frequency channel is connected to the licensed band radio frequency channel or the unlicensed band radio frequency channel. FIG. 7 is a schematic diagram illustrating sharing of a licensed band radio frequency channel by a signal of the unlicensed band communication protocol receipt (transmission) digital processing module and a signal of the licensed band communication protocol receipt (transmission) digital processing module.

Figure 8:
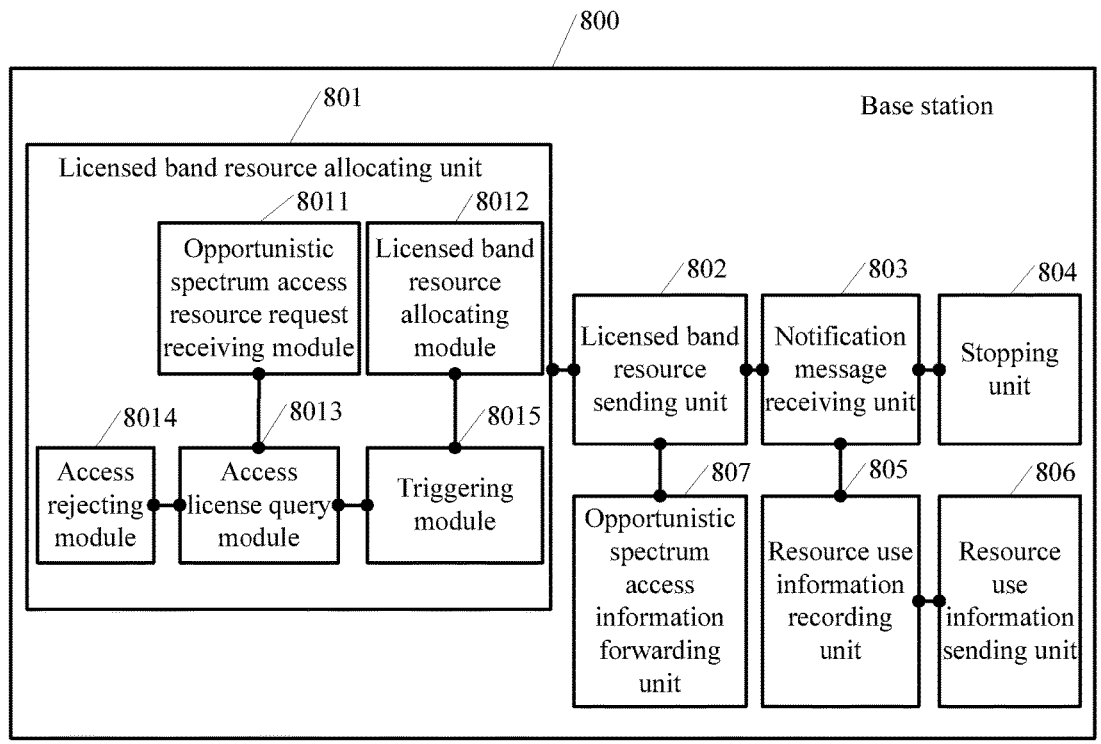
FIG. 8 is a schematic diagram of a base station according to an embodiment of the present invention.

The first multimode terminal provided in the embodiments of the present invention is described in the above embodiment and a base station provided in the embodiments of the present invention will be described in the following. As shown in FIG. 8, a base station 800 provided in an embodiment of the present invention includes: a licensed band resource allocating unit 801 configured to allocate a licensed band resource for use by a first multimode terminal in opportunistic spectrum access mode to the first multimode terminal; and a licensed band resource sending unit 802 configured to send, to the first multimode terminal, information about the licensed band resource for use by the first multimode terminal in opportunistic spectrum access mode, where the licensed band resource is used for the first multimode terminal to communicate with a second multimode terminal using an unlicensed band protocol standard.

After allocating the licensed band resource to the first multimode terminal, the base station 800 sends the information about the resource to the first terminal, so that the first terminal uses the licensed band resource to communicate with the second multimode terminal. It should be noted that the licensed band resource information is used to indicate the licensed band resource allocated to the first multimode terminal by the base station, and after the first multimode terminal receives the licensed band resource information, the first multimode terminal can obtain the licensed band resource allocated by the base station 800.

The licensed band resource allocating unit 801 and the licensed band resource sending unit 802 may respectively be a processor and a hardware interface. According to the embodiment of the present invention, in a practical application, in an optional implementation manner, the base station 800 may further include: a notification message receiving unit 803 configured to receive a notification message sent by the first multimode terminal, where the notification message is used to indicate that the first multimode terminal has exited the opportunistic spectrum access communication mode after completing the communication with the second multimode terminal, where after the first multimode terminal has exited the opportunistic spectrum access communication mode, for example, after the first multimode terminal completes the communication with the second multimode terminal, the first multimode terminal sends a notification message to the base station 800 and the notification message receiving unit 803 can receive the notification message and trigger a stopping unit 804 to execute; and the stopping unit 804 configured to stop allocation of the licensed band resource to the first multimode terminal, so that the band is idle and can be used to allocate to another multimode terminal, thereby increasing utilization efficiency of the network.

According to the embodiment of the present invention, in a practical application, in an optional implementation manner, the base station 800 may further include: a resource use information recording unit 805 configured to record time information of use of the licensed band resource by the first multimode terminal and/or size information of the licensed band resource; and a resource use information sending unit 806 configured to send the time information of the use of the licensed band resource by the first multimode terminal and/or the size information of the licensed band resource to a subscriber data center, so that the subscriber data center implements charging on the first multimode terminal.

According to the embodiment of the present invention, in a practical application, in an optional implementation manner, the base station 800 may further include: an opportunistic spectrum access information forwarding unit 807 configured to, when the first multimode terminal is handed over, send information that the first multimode terminal works in opportunistic spectrum access mode to a target base station, so that the target base station allocates the first multimode terminal a licensed band resource that can be used in opportunistic spectrum access mode.

In a practical application, the licensed band resource allocating unit 801 may include: an opportunistic spectrum access resource request receiving module 8011 configured to receive from the first multimode terminal a licensed band idle resource request and/or a request for a licensed band resource dedicated to use in opportunistic spectrum access mode; and a licensed band resource allocating module 8012 configured to allocate a licensed band idle resource and/or a preset licensed band resource dedicated to use in opportunistic spectrum access mode to the first multimode terminal.

In a practical application, in another implementation manner, the licensed band resource allocating unit 801 may include the licensed band resource allocating module 8012, but not include the opportunistic spectrum access resource request receiving module 8011. The licensed band resource allocating module 8012 is configured to allocate a licensed band idle resource or a preset licensed band resource dedicated to use in opportunistic spectrum access mode to the first multimode terminal.

In a practical application, the licensed band resource allocating unit 801 may further include: an access license query module 8013 configured to query a subscriber data center about an opportunistic spectrum access license state of the first multimode terminal; an access rejecting module 8014 configured to, when the opportunistic spectrum access license state indicates that the first multimode terminal has not subscribed to an opportunistic spectrum access service with the subscriber data center, reject the licensed band idle resource request and/or the request for a licensed band resource dedicated to use in opportunistic spectrum access mode from the first multimode terminal; and a triggering module 8015 configured to, when the opportunistic spectrum access license state indicates that the first multimode terminal has subscribed to an opportunistic spectrum access service with the subscriber data center, trigger the licensed band resource allocating module 8012 to execute.

In a practical application, the licensed band resource sending unit 802 is specifically configured to notify the first multimode terminal, by means of unicast, of the information about the licensed band resource for use by the first multimode terminal in opportunistic spectrum access mode; or, the licensed band resource sending unit 802 is specifically configured to notify the first multimode terminal, by means of broadcast, of the information about the licensed band resource for use by the first multimode terminal in opportunistic spectrum access mode; or, the licensed band resource sending unit 802 is specifically configured to notify the first multimode terminal, by means of multicast, of the information about the licensed band resource for use by the first multimode terminal in opportunistic spectrum access mode.

In a practical application, the licensed band resource sending unit 802 is specifically configured to notify the first multimode terminal, by using physical layer signaling or high layer signaling, of the information about the licensed band resource for use by the first multimode terminal in opportunistic spectrum access mode.

In the above embodiment, only structural relationships among units and modules are described. For an execution method of the units and modules in a practical application, refer to the method illustrated in FIG. 2, which will not be described here further.

In the embodiment of the present invention, the licensed band resource allocating unit 801 allocates the first multimode terminal a licensed band resource that can be used in opportunistic spectrum access mode, and then the licensed band resource sending unit 802 sends, to the first multimode terminal, information about the licensed band resource for use in opportunistic spectrum access mode, which implements communication between the first multimode terminal and a second multimode terminal and increases utilization efficiency of licensed bands. Because the licensed band resource used by the first multimode terminal is allocated by the base station to the first multimode terminal for opportunistic spectrum access, and is not decided by an unlicensed user, interference caused by an unlicensed user to a licensed user can be avoided.

Figure 9:
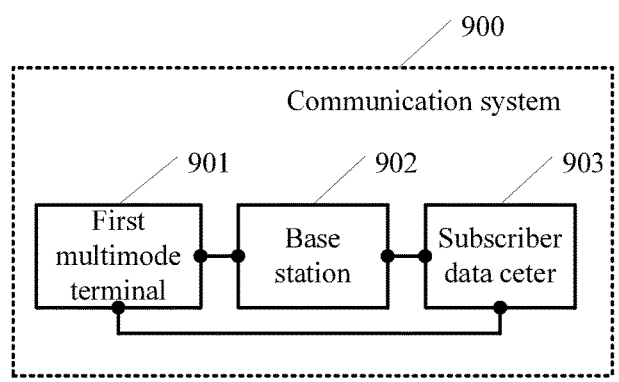
FIG. 9 is a schematic diagram of a communication system according to an embodiment of the present invention.

A communication system 900 illustrated in FIG. 9 includes: a first multimode terminal 901 configured to obtain from a licensed band network a licensed band resource that can be used in opportunistic spectrum access mode, and communicate with a second multimode terminal on the licensed band resource using an unlicensed band protocol standard; and subscribe to an opportunistic spectrum access service with a subscriber data center 903; a base station 902 configured to send, to the subscriber data center 903, a request for querying whether the first multimode terminal 901 has subscribed to the opportunistic spectrum access service, receive an opportunistic spectrum access license state of the first multimode terminal 901 returned by the subscriber data center 903, and if the opportunistic spectrum access license state of the first multimode terminal 901 indicates that the first multimode terminal 901 has subscribed to the opportunistic spectrum access service, allocate a licensed band resource to the first multimode terminal 901 and send information about the licensed band resource to the first multimode terminal 901; and the subscriber data center 903 is configured to record whether the first multimode terminal 901 has subscribed to the opportunistic spectrum access service; receive from the base station the request for querying whether the first multimode terminal 901 has subscribed to the opportunistic spectrum access service and return the license state of the first multimode terminal 901; and further, perform charging on the first multimode terminal 901 according to time information of use of the licensed band resource by the first multimode terminal 901 and/or size information of the licensed band resource which are sent by the base station 902.

For a specific implementation manner of the first multimode terminal 901 and the base station 902, reference may be made to the foregoing multimode terminal and base station embodiments, which will not be described here further.

In the above embodiment, only structural relationships among units and modules are described. In a practical application, the first multimode terminal 901 may include multiple units and modules and refer to the method illustrated in FIG. 1 for a specific execution method thereof. The base station 902 may include multiple units and modules and refer to the method illustrated in FIG. 2 for a specific execution method thereof.

In the embodiment of the present invention, the first multimode terminal 901 in the communication system 900 obtains from the base station 902 a licensed band resource that can be used in opportunistic spectrum access mode, and then communicates with the second multimode terminal on the licensed band resource using an unlicensed band protocol standard, which implements communication based on an unlicensed band protocol standard and increases utilization efficiency of licensed bands. Because the licensed band resource used by the first multimode terminal 901 is allocated by the licensed band network to implement opportunistic spectrum access, and is not decided by an unlicensed user, interference caused by an unlicensed user to a licensed user can be avoided.

Figure 10:
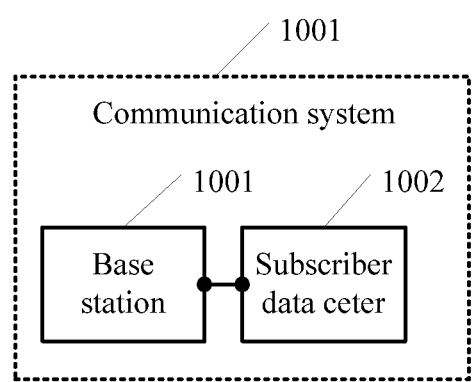
FIG. 10 is a schematic diagram of another communication system according to an embodiment of the present invention.

In the above embodiment, a communication process inside the communication system 900 is described. Another communication system provided in an embodiment of the present invention will be described. Referring to a communication system 1000 illustrated in FIG. 10, the communication system 1000 is configured to implement communication with a first multimode terminal and the communication system 1000 may include a base station 1001 and a subscriber data center 1002.

The base station 1001 is configured to allocate a licensed band resource for use by a first multimode terminal in opportunistic spectrum access mode to the first multimode terminal, where the first multimode terminal can communicate with a second multimode terminal on the licensed band resource using an unlicensed band protocol standard.

The subscriber data center 1002 is configured to record whether the first multimode terminal has subscribed to an opportunistic spectrum access service.

The base station 1001 is further configured to send, to the subscriber data center 1002, a request for querying whether the first multimode terminal has subscribed to the opportunistic spectrum access service.

The subscriber data center 1002 is further configured to receive from the base station 1001 the request for querying whether the first multimode terminal has subscribed to the opportunistic spectrum access service and return an opportunistic spectrum access license state of the first multimode terminal.

The base station 1001 is further configured to receive the opportunistic spectrum access license state of the first multimode terminal returned by the subscriber data center 1002, and if the opportunistic spectrum access license state of the first multimode terminal indicates that the first multimode terminal has subscribed to the opportunistic spectrum access service with the subscriber data center 1002, allocate the licensed band resource to the first multimode terminal and send information about the licensed band resource to the first multimode terminal.

For a specific implementation manner of the first multimode terminal and the base station 1001, reference may be made to the description of the foregoing multimode terminal and base station embodiments, which will not be described here further.

In the above embodiment, only structural relationships among units and modules are described. In a practical application, the base station may include multiple units and modules and the method illustrated in FIG. 2 can be referenced for a specific execution method thereof, which will not be described here further.

In the embodiment of the present invention, the base station 1001 in the communication system 1000 queries the subscriber data center 1002 about an opportunistic spectrum access license state of a first multimode terminal, and if the first multimode terminal has subscribed to an opportunistic spectrum access service with the subscriber data center 1002, the base station 1001 allocates the first multimode terminal a licensed band resource that can be used by the first multimode terminal in opportunistic spectrum access mode, so that the first multimode terminal implements communication with a second multimode terminal on the licensed band resource using an unlicensed band protocol standard, which implements communication based on an unlicensed band protocol standard and increases utilization efficiency of licensed bands. Because the licensed band resource used by the first multimode terminal is allocated by the licensed band network to implement opportunistic spectrum access, and is not decided by an unlicensed user, interference caused by an unlicensed user to a licensed user can be avoided.

A person of ordinary skill in the art can understand that all or a part of the steps of the methods in the foregoing embodiments may be implemented by a program instructing relevant hardware. The program may be stored in a computer readable storage medium. The storage medium may be a read-only memory, a magnetic disk, or an optical disc.

The communication method, multimode terminal, base station, and communication system of the present invention have been described in detail, and a person of ordinary skill in the art can make variations to specific implementation manners and the application scope according to ideas of the embodiments of the present invention. To conclude, the specification herein should not be understood as to limit the present invention.

What is claimed is:

1. A communication method, comprising:
broadcasting, by the base station, licensed band idle resource information regarding licensed band resources dedicated to use in opportunistic spectrum access mode for detection by multimode terminals in need of opportunistic spectrum access;
allocating, by a base station to a first multimode terminal, a licensed band resource for use by the first multimode terminal in an opportunistic spectrum access mode after broadcasting the licensed band idle resource information,
wherein before allocating the licensed band idle resource and/or the preset licensed band resource dedicated to use in the opportunistic spectrum access mode, the method further comprises receiving, by the base station from the first multimode terminal, a licensed band idle resource request and/or a request for a licensed band resource dedicated to use in the opportunistic spectrum access mode;
sending, by the base station to the first multimode terminal, information about the licensed band resource for use by the first multimode terminal in the opportunistic spectrum access mode, wherein the licensed band resource is used for the first multimode terminal to communicate with a second multimode terminal using an unlicensed band protocol standard; and
sending, by the base station, information that the first multimode terminal works in the opportunistic spectrum access mode to a target base station when the first multimode terminal is handed over so that the target base station allocates the first multimode terminal a licensed band resource for use by the first multimode terminal in the opportunistic spectrum access mode.

2. The communication method according to claim 1, wherein allocating the licensed band resource for use by the first multimode terminal in the opportunistic spectrum access mode comprises allocating, by the base station to the first multimode terminal, a licensed band idle resource and/or a preset licensed band resource dedicated to use in the opportunistic spectrum access mode.

3. The communication method according to claim 1, wherein before allocating the licensed band idle resource or the preset licensed band resource dedicated to use in the opportunistic spectrum access mode, the method further comprises:
querying, by the base station, a subscriber data center about an opportunistic spectrum access license state of the first multimode terminal; and
rejecting, by the base station, the licensed band idle resource request and/or the request for a licensed band resource dedicated to use in opportunistic spectrum access mode from the first multimode terminal when the opportunistic spectrum access license state indicates that the first multimode terminal has not subscribed to an opportunistic spectrum access service with the subscriber data center.

4. The communication method according to claim 1, wherein before allocating the licensed band idle resource or the preset licensed band resource dedicated to use in the opportunistic spectrum access mode, the method further comprises:
querying, by the base station, a subscriber data center about an opportunistic spectrum access license state of the first multimode terminal; and
allocating, by the base station to the first multimode terminal, the licensed band idle resource or the licensed band resource dedicated to use in opportunistic spectrum access mode when the opportunistic spectrum access license state indicates that the first multimode terminal has subscribed to an opportunistic spectrum access service with the subscriber data center.

5. The communication method according to claim 1, wherein sending the information about the licensed band resource for use by the first multimode terminal in the opportunistic spectrum access mode comprises:
   notifying, by the base station using unicast, the first multimode terminal of the information about the licensed band resource for use by the first multimode terminal in the opportunistic spectrum access mode; or
   notifying, by the base station using broadcast, the first multimode terminal of the information about the licensed band resource for use by the first multimode terminal in the opportunistic spectrum access mode; or
   notifying, by the base station using multicast, the first multimode terminal of the information about the licensed band resource for use by the first multimode terminal in the opportunistic spectrum access mode; or
   sending, by the base station to the first multimode terminal by using physical layer signaling or high layer signaling, the information about the licensed band resource for use by the first multimode terminal in the opportunistic spectrum access mode.

6. The communication method according to claim 1, wherein the licensed band resource used by the first multimode terminal in the opportunistic spectrum access mode is a dynamically configured licensed band resource, a semi-statically configured licensed band resource, a periodically configured licensed band resource, or a licensed band resource configured according to a one-off trigger.

7. The communication method according to claim 1, wherein after sending the information about the licensed band resource for use by the first multimode terminal in opportunistic spectrum access mode, the method further comprises:
   receiving, by the base station, a notification message sent by the first multimode wherein the notification message is used to indicate that the first multimode terminal has exited the opportunistic spectrum access communication mode; and
   stopping, by the base station, allocation of the licensed band resource to the first multimode terminal.

8. The communication method according to claim 1, further comprising:
   recording, by the base station, time information of use of the licensed band resource by the first multimode terminal and/or size information of the licensed band resource; and
   sending, by the base station, the time information of the use of the licensed band resource by the first multimode terminal and/or the size information of the licensed band resource to a subscriber data center so that the subscriber data center implements charging on the first multimode terminal.

9. A base station, comprising:
   a transmitter configured to broadcast licensed band idle resource information regarding licensed band resources dedicated to use in opportunistic spectrum access mode for detection by multimode terminals in need of opportunistic spectrum access; and
   a processor coupled to the transmitter and configured to allocate a licensed band resource for use by a first multimode terminal in an opportunistic spectrum access mode to the first multimode terminal after broadcasting the licensed band idle resource information,
   wherein the transmitter is further configured to send, to the first multimode terminal, information about the licensed band resource for use by the first multimode terminal in opportunistic spectrum access mode after allocating the licensed band resource for use by the first multimode terminal,
   wherein the licensed band resource is used for the first multimode terminal to communicate with a second multimode terminal using an unlicensed band protocol standard;
   a receiver coupled to the processor and configured to receive from the first multimode terminal a licensed band idle resource request and/or a request for a licensed band resource dedicated to use in opportunistic spectrum access mode;
   wherein the transmitter is further configured to send information that the first multimode terminal works in opportunistic spectrum access mode to a target base station when the first multimode terminal is handed over so that the target base station allocates the first multimode terminal a licensed band resource for use in opportunistic spectrum access mode.

10. The base station according to claim 9, wherein the processor is further configured to allocate a licensed band idle resource and/or a preset licensed hand resource dedicated to use in opportunistic spectrum access mode to the first multimode terminal.

11. The base station according to claim 9, wherein the processor is further configured to:
    query a subscriber data center about an opportunistic spectrum access license state of the first multimode terminal;
    reject the licensed band idle resource request and/or the request for a licensed band resource dedicated to use in opportunistic spectrum access mode from the first multimode terminal when the opportunistic spectrum access license state indicates that the first multimode terminal has not subscribed to an opportunistic spectrum access service with the subscriber data center; and
    trigger the allocation of the licensed band resource for use by a first multimode terminal when the opportunistic spectrum access license state indicates that the first multimode terminal has subscribed to an opportunistic spectrum access service with the subscriber data center.

12. The base station according to claim 9, wherein the transmitter is further configured to:
    notify the first multimode terminal, using unicast, of the information about the licensed band resource for use by the first multimode terminal in the opportunistic spectrum access mode; or
    notify the first multimode terminal, using broadcast, of the information about the licensed band resource for use by the first multimode terminal in the opportunistic spectrum access mode; or
    notify the first multimode terminal, using unicast, of the information about the licensed band resource for use by the first multimode terminal in the opportunistic spectrum access mode; or
    notify the first multimode terminal, by using physical layer signaling or high layer signaling, of the information about the licensed band resource for use by the first multimode terminal in the opportunistic spectrum access mode.

13. The base station according to claim 9, further comprising:
    a receiver coupled to the processor and configured to receive a notification message sent by the first multimode terminal, wherein the notification message is used to indicate that the first multimode terminal has exited the opportunistic spectrum access communication mode,
wherein the processor is further configured to stop allocation of the licensed band resource to the first multimode terminal.

14. The base station according to claim 9, wherein the processor is further configured to record time information of use of the licensed band resource by the first multimode terminal and/or size information of the licensed band resource, and
wherein the transmitter is further configured to send the time information of the use of the licensed band resource by the first multimode terminal and/or the size information of the licensed band resource to a subscriber data center so that the subscriber data center implements charging on the first multimode terminal.

15. A communication system, comprising:
a subscriber data center;
a first multimode terminal configured to:
obtain from licensed band network a licensed band resource that is configured to be used in an opportunistic spectrum access mode;
communicate with a second multimode terminal on the licensed band resource using an unlicensed band protocol standard; and
subscribe to an opportunistic spectrum access service with the subscriber data center; and
a base station configured to:
send, to the subscriber data center, a request for querying whether the first multimode terminal has subscribed to the opportunistic spectrum access service;
receive an opportunistic spectrum access license state of the first multimode terminal returned by the subscriber data center;
allocate a licensed band resource to the first multimode terminal when the opportunistic spectrum access license state of the first multimode terminal indicates that the first multimode terminal has subscribed to the opportunistic spectrum access service;
send information about the licensed band resource to the first multimode terminal,
receive from the first multimode terminal a licensed band idle resource request and/or a request for a licensed band resource dedicated to use in opportunistic spectrum access mode; and
send information that the first multimode terminal works in opportunistic spectrum access mode to a target base station when the first multimode terminal is handed over so that the target base station allocates the first multimode terminal a licensed band resource for use in opportunistic spectrum access mode,
wherein the subscriber data center is configured to:
record whether the first multimode terminal has subscribed to the opportunistic spectrum access sendee;
receive information regarding a capability of the first multimode terminal to use the opportunistic spectrum access service from the first multimode terminal;
receive from the base station the request for querying whether the first multimode terminal has subscribed to the opportunistic spectrum access service; and
return the opportunistic spectrum access license state of the first multimode terminal.

16. A communication system, comprising:
a base station configured to allocate a licensed band resource for use by a first multimode terminal in opportunistic spectrum access mode to the first multimode terminal,
wherein the first multimode terminal is configured to communicate with a second multimode terminal on the licensed band resource using an unlicensed band protocol standard; and
a subscriber data center configured to:
record whether the first multimode terminal has subscribed to an opportunistic spectrum access service; and
receive information regarding a capability of the first multimode terminal to use the opportunistic spectrum access service from the first multimode terminal,
wherein the base station is further configured to send, to the subscriber data center, a request for querying whether the first multimode terminal has subscribed to an opportunistic spectrum access service,
wherein the subscriber data center is further configured to:
receive from the base station the request for querying whether the first multimode terminal has subscribed to the opportunistic spectrum access service; and
return an opportunistic spectrum access license state of the first multimode terminal, and
wherein the base station is further configured to:
receive the opportunistic spectrum access license state of the first multimode terminal returned by the subscriber data center;
allocate the licensed band resource to the first multimode terminal and send information about the licensed band resource to the first multimode terminal when the opportunistic spectrum access license state of the first multimode terminal indicates that the first multimode terminal has subscribed to the opportunistic spectrum access service with the subscriber data center;
receive from the first multimode terminal a licensed band idle resource request and/or a request for a licensed band resource dedicated to use in opportunistic spectrum access mode; and
send information that the first multimode terminal works in opportunistic spectrum access mode to a target base station when the first multimode terminal is handed over so that the target base station allocates the first multimode terminal a licensed band resource for use in opportunistic spectrum access mode.

* * * * *